UNITED STATES PATENT OFFICE.

FRED GROVER FULLY, OF PORTLAND, OREGON, ASSIGNOR OF FORTY PER CENT. TO JULIAN H. DIX, OF PORTLAND, OREGON.

COATING COMPOSITION.

1,344,686.     Specification of Letters Patent.     Patented June 29, 1920.

No Drawing.     Application filed March 29, 1919. Serial No. 286,087.

*To all whom it may concern:*

Be it known that I, FRED G. FULLY, a citizen of the United States, residing at Portland, in the county of Multnomah and State of Oregon, have invented new and useful Improvements in Coating Compositions, of which the following is a specification.

This invention relates to a composition to be placed upon glass for preventing water from sticking thereto.

The object of the invention is to provide a coating for the glass in wind shields of automobiles and windows of cars and the like for preventing the formation thereon of drops of water which will obscure the vision of the operator of the vehicle.

The composition consists of a mixture of syrup, cinnamon, sodium bicarbonate and water. In preparing the composition I prefer to use the ingredients in about the following proportions—viz., 66% of syrup, 33% of boiled water and 1% solution of sodium bicarbonate and cinnamon. I prefer to use $\frac{1}{10}$ of 1% of sodium bicarbonate and $\frac{9}{10}$ of 1% of cinnamon in this solution.

The syrup, which is preferably made from corn, is first mixed with the water and then the solution of soda and cinnamon is added. The cinnamon is used in ground form and its function is to color the composition and give it a pleasant odor.

The solution is applied to the outer face of the glass or that face which is exposed to the weather. When so treated, the water will quickly run off the coated surface leaving the same clear so that the vision of the driver is not obstructed. My solution will also prevent the sweat and steam from clogging on windows or the like in buildings.

What I claim is:—

1. A composition for preventing the formation of drops of water on glass comprising a mixture of syrup, water, sodium bicarbonate and cinnamon.

2. A composition for preventing the formation of drops of water on glass comprising 66% of syrup, 33% of boiled water, 0.1% sodium bicarbonate and 0.9% of cinnamon.

In testimony whereof I affix my signature.

FRED GROVER FULLY.